United States Patent
Yang et al.

(10) Patent No.: US 11,694,690 B2
(45) Date of Patent: Jul. 4, 2023

(54) METHOD AND SYSTEM PROVIDING SERVICE BASED ON USER VOICE

(71) Applicant: YP LABS CO., LTD., Seoul (KR)

(72) Inventors: Yoon Ho Yang, Seoul (KR); Jun Sung Hong, Seoul (KR)

(73) Assignee: YP LABS CO., LTD., Seoul (KR)

( * ) Notice: Subject to any disclaimer, the term of this patent is extended or adjusted under 35 U.S.C. 154(b) by 0 days.

(21) Appl. No.: 17/852,671

(22) Filed: Jun. 29, 2022

(65) Prior Publication Data

US 2022/0351730 A1 Nov. 3, 2022

Related U.S. Application Data

(63) Continuation of application No. PCT/KR2020/005888, filed on May 4, 2020.

(30) Foreign Application Priority Data

Apr. 9, 2020 (KR) .................. 10-2020-0043150

(51) Int. Cl.
  *G10L 25/63* (2013.01)
  *G10L 15/22* (2006.01)
  (Continued)

(52) U.S. Cl.
  CPC .............. *G10L 15/22* (2013.01); *G10L 15/16* (2013.01); *G10L 25/30* (2013.01); *G10L 25/63* (2013.01);
  (Continued)

(58) Field of Classification Search
  CPC ...................................................... G10L 25/63
  See application file for complete search history.

(56) References Cited

U.S. PATENT DOCUMENTS

2016/0154569 A1* 6/2016 Rad ...................... G06F 16/248
  715/739
2021/0142820 A1* 5/2021 Raikar .................... G06F 40/30

FOREIGN PATENT DOCUMENTS

KR 10-2013-0006730 A 1/2013
KR 10-2017-0019948 A 2/2017

OTHER PUBLICATIONS

Sefara, Tshephisho Joseph. "The effects of normalisation methods on speech emotion recognition." 2019 International multidisciplinary information technology and engineering conference (IMITEC). IEEE, 2019. (Year: 2019).*

(Continued)

*Primary Examiner* — Jialong He
(74) *Attorney, Agent, or Firm* — Sughrue Mion, PLLC

(57) ABSTRACT

A method for providing a service based on a user's voice includes steps of extracting a voice of a first user, generating text information or voice waveform information based on the voice of the first user, analyzing a disposition of the first user based on the text information and the voice waveform information, and then selecting a second user corresponding to the disposition of the first user based on the analysis result, providing the first user with a conversation connection service with the second user and acquiring information on a change in an emotional state of the first user based on conversation information between the first user and the second user, and re-selecting the second user corresponding to the disposition of the first user based on the acquired information on the change in the emotional state of the first user.

7 Claims, 13 Drawing Sheets

(51) Int. Cl.
  *G10L 15/16*    (2006.01)
  *G10L 25/30*    (2013.01)
(52) U.S. Cl.
  CPC .. *G10L 2015/225* (2013.01); *G10L 2015/227* (2013.01)

(56) References Cited

OTHER PUBLICATIONS

Jung Hyun Lee et al., "CNN-based Emotion Recognition Model using Various Voice Feature Values", Proceedings of Korean Institute of Information Scientists and Engineers Conference, Korean Institute of Information Scientists and Engineers, Jun. 2019, pp. 757-759.
International Search Report for PCT/KR2020/005888 dated Jan. 8, 2021 (PCT/ISA/210).

\* cited by examiner

METHOD AND SYSTEM PROVIDING SERVICE BASED ON USER VOICE

CROSS-REFERENCE TO RELATED APPLICATION

This application is a bypass continuation of and claims the benefits of PCT/KR2020/005888 filed May 4, 2020, which claims the benefit of Korean Patent Application No. 10-2020-0043150, filed on Apr. 9, 2020 in the Korean Intellectual Property Office, the disclosures of which are incorporated herein by reference in their entireties.

TECHNICAL FIELD

The present invention relates to a method and system for providing a service based on a user's voice, and more specifically, an invention relating to a technology that analyzes the user's voice to classify the user's disposition, and then connecting a conversation partner having a fitting disposition with the user based thereon.

BACKGROUND

Currently, the number of single-person households is gradually increasing not only in foreign countries but also in Korea, and according to the publication of Statistics Korea, as of 2018, single-person households in Korea have exceeded approximately 5 million and it was evaluated that the most common difficulty faced by single-person households was psychological anxiety and loneliness.

In the past, such psychological anxiety and loneliness were resolved through online activities by connecting to the Internet on personal computers indoors to chat with anonymous persons or join various community websites online. However, this also involved activities performed in isolated spaces, and could not provide a fundamental solution to resolving psychological anxiety and loneliness.

Recently, based on the development of smart terminal technology, various apps that may be used on smart communication devices are used to form relationships with others, and such apps provide various communities, meeting mediation, services, matching services, etc. online.

However, for such online meeting system, the user is required to subscribe to a specific website to pay a fee to arrange an intentional meeting, and such online meeting operating system had the problem that the operator operating the online website would randomly be matching the members without reflecting the disposition of the registered members. Thus, due to a lack of objective and rational information about the other member, there were many cases where actual meetings would be held without being able to fully grasp the disposition of the other member, which led to many cases where continued relationships could not be maintained.

Accordingly, conversation connection services have been recently released to connect people who can comfortably share their thoughts and chat while simultaneously reducing the burden of such offline meetings, which are receiving favorable responses from many people.

However, even in the services according to conventional technology, the operators providing such services also randomly matched registered members as conversation partners, and thus, there were problems where the arrangements did not lead to continued conversations when each other's conversational styles did not match.

In addition, when talking over the phone, conversations can continue only when the tastes or personalities of each other are well matched, more than when talking in person. However, the services according to conventional technology had the problem of connecting conversation partners without properly reflecting the user's tastes, or dispositions and personalities, etc.

SUMMARY

Technical Objects

Accordingly, the method and system for providing a service based on a user's voice according to an embodiment is an invention devised to solve the problem described above, which has the objective of providing a service that can further increasing the satisfaction of conversations by analyzing the disposition of a user based on the user's voice and conversations, and then connecting the user with a conversation partner that has matching dispositions based thereon.

A method for providing a service based on a user's voice may comprise extracting a voice of a first user, generating text information or voice waveform information based on the voice of the first user, analyzing a disposition of the first user based on the text information and the voice waveform information, and then selecting a second user corresponding to the disposition of the first user based on the analysis result, providing the first user with a conversation connection service with the second user and acquiring information on a change in an emotional state of the first user based on conversation information between the first user and the second user, and re-selecting the second user corresponding to the disposition of the first user based on the acquired information on the change in the emotional state of the first user.

The analyzing the disposition of the first user may comprise analyzing the disposition of the first user based on a frequency of appearance of a specific word in the text information of the first user.

The method for providing a service based on a user's voice may further comprise providing a feedback on analyzing the disposition of the first user and selecting the second user based on at least one of rating information input after a call between the first user and a second user, call time information, whether a call has been extended, frequency of appearance of a specific word during a call and whether a fee has been paid.

The analyzing the disposition of the first user and selecting the second user may comprise performing deep-learning based on a speech emotion recognition model based on CNN (Convolutional Neural Network) by applying at least one of user voice information and user profile information as an input value and applying a user's emotional information and disposition information as an output value to analyze the disposition of the first user and select the second user.

The speech emotion recognition model based on CNN may apply a structure implemented by applying multinomial logistic regression after connecting the output value of each neural network instead of a Softmax layer to a concatenate layer.

The speech emotion recognition model based on CNN may use at least one of Mel-spectrogram, MFCC, Roll off and Centroid as a feature value.

The analyzing the disposition of the first user may comprise analyzing the disposition of the first user based on response information of the first user on a disposition analysis survey.

The analyzing the disposition of the first user may comprise analyzing the disposition of the first user using at least one of the sex, age, voice range and speed of the first user.

The selecting the second user may comprise selecting a second user based on a type of conversation preferred by the first user for each time period.

A system for providing a service based on a user's voice may comprise a first user terminal, a communication unit for receiving a first user's voice information from the first user terminal and an artificial neural network unit for generating the first user's text information and voice waveform information based on the voice information, and then analyzing the disposition of the first user based on the generated information, and acquiring information on a change in the emotional state of the first user based on a conversation between the first user and another user, and then selecting a second user corresponding to the disposition of the first user based on the information on the change in the emotional state of the first user and the disposition of the first user.

The artificial neural network unit may provide feedback based on at least one of rating information input after a call between the first user and a second user, call time information, whether a call has been extended, frequency of appearance of a specific word during a call and whether a fee has been paid to analyze the disposition of the first user and select the second user.

The artificial neural network unit may perform deep-learning based on a speech emotion recognition model based on CNN (Convolutional Neural Network) by applying at least one of user voice information and user profile information as an input value and applying a user's emotional information and disposition information as an output value to analyze the disposition of the first user and select the second user.

Effects

A method and system of providing a service based on a user's voice according to an embodiment analyzes the disposition of a user based on the user's voice and conversations, and then connects the user with a partner to allow conversations to flow smoothly based on the analysis result, and thus, has the advantage of allowing the users to more easily continue their conversation Furthermore, it connects conversation partners having similar dispositions as the user, and thus, it becomes easy for the user to identify with the partner based on the smooth progression of their conversation.

Furthermore, in the case where a lot of one's information is exposed when connecting with a conversation partner, it is difficult to comfortably proceed with conversations. However, in the case of the present invention, the specific information of a partner is unknown until each other's profiles are exchanged, and thus, it becomes easy to share secrets or feelings with the other person, and thereby allowing the user to obtain psychological stability through the conversations.

DETAILED DESCRIPTION OF EMBODIMENTS

Figure 1:
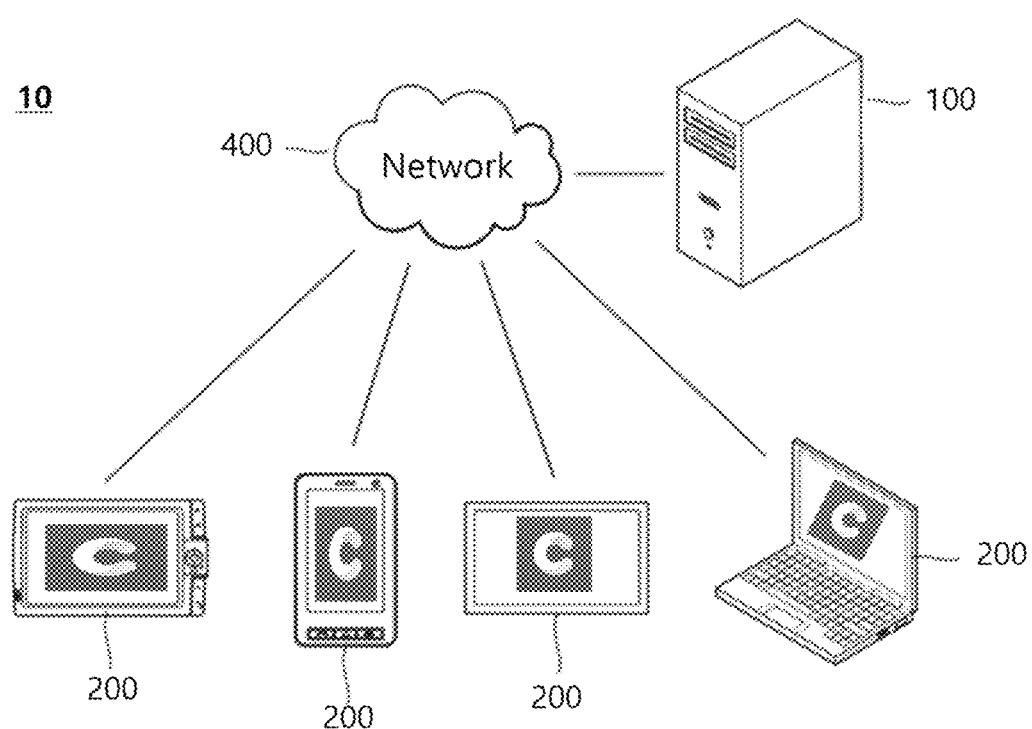
FIG. 1 is a diagram illustrating the relationship between a service providing apparatus and a user terminal in a service providing system based on a user's voice according to an embodiment.

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below, but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

FIG. 1 is a diagram illustrating the relationship between a service providing apparatus (100) and a user terminal (200) in a service providing system (10) based on a user's voice according to an embodiment.

Referring to FIG. 1, the entire system for providing a conversation connection service may include a service providing apparatus (100) for providing a conversation connection service, at least one user terminal (200) and a network (400).

The user terminal (200) is a device that can provide the user with the conversation connection service by connecting the user with the service providing apparatus (100), of which one or many may be present. Accordingly, different users may use different terminals (200) to be mutually connected through the service providing apparatus (100) and the network (400), in order to perform mutual communication.

Accordingly, the user terminal (100) may be a fixed terminal or a portable mobile terminal. As one or more terminals (200), navigation, smart phone, mobile phone, computer, laptop computer, digital broadcasting terminal, PDA (Personal Digital Assistant), PMP (Portable Multimedia Player), MID (Mobile Internet Device), tablet PC, etc. may correspond thereto.

Communication provided by the network (400) may be implemented as all types of wired/wireless networks, such as Local Area Network (LAN), Wide Area Network (WAN), Value Added Network (VAN), Personal Area Network (PAN), mobile radiocommunication network or satellite communication network, etc., and for example, a network that can mutually communicate by communication methods of telecommunication network, UPnP (Universal Plug and Play), Wi-Fi, etc. may be provided.

The user terminal (200) may communicate with different terminals (200) and the network (400) via the service providing apparatus (100). Furthermore, the terminals (200) connected to the network (400) may share various contents including profile information for a conversation connection service according to an embodiment of the present invention with each other.

To achieve this, the service providing apparatus (100) may configure a message application network or a social network, or relay communication between an external messenger application device or a social network service providing device. Furthermore, the service providing apparatus (100) may directly or indirectly control the user terminal (200) to provide a conversation connection service according to an embodiment of the present invention using each user terminal (200).

Based thereon, each of the one or more user terminal(s) (200) may be connected to the service providing apparatus (100) through the network (400), and may register profile information including the user's voice information or transmit a message to the service providing apparatus (100). The technical concept of this document may be applied to all network services configured similarly to a message service or a social network service.

In particular, a social network may be formed by a social relationship structure created by an interdependent tie between each node on the web. The nodes included within a social network may represent individual subjects existing in the network. Each node constituting the network may be the terminals (200) described above.

Again referring to FIG. 1, the service providing apparatus (100) may verify the profile information of the user (may also be referred to as a member) subscribed to the conversation connection service, and may provide an online conversation connection service regularly connecting a conversation partner between verified members.

The users may be provided with the conversation connection service using their own user terminal (200), and when a matching is determined, additional functions, such as the messenger service between the users, etc. may be further provided through the conversation connection service based on whether a fee has been paid.

Such service providing apparatus (100) may be, for example, an application server, or a management server device located on the network independently from the application server, and may provide application installation data corresponding to the conversation connection service to the terminal (200) of each user connected through the network (400), or process user registration and collect profile information including the user's voice information through the application, and provide a different user with the conversation connection service based thereon.

Figure 2:
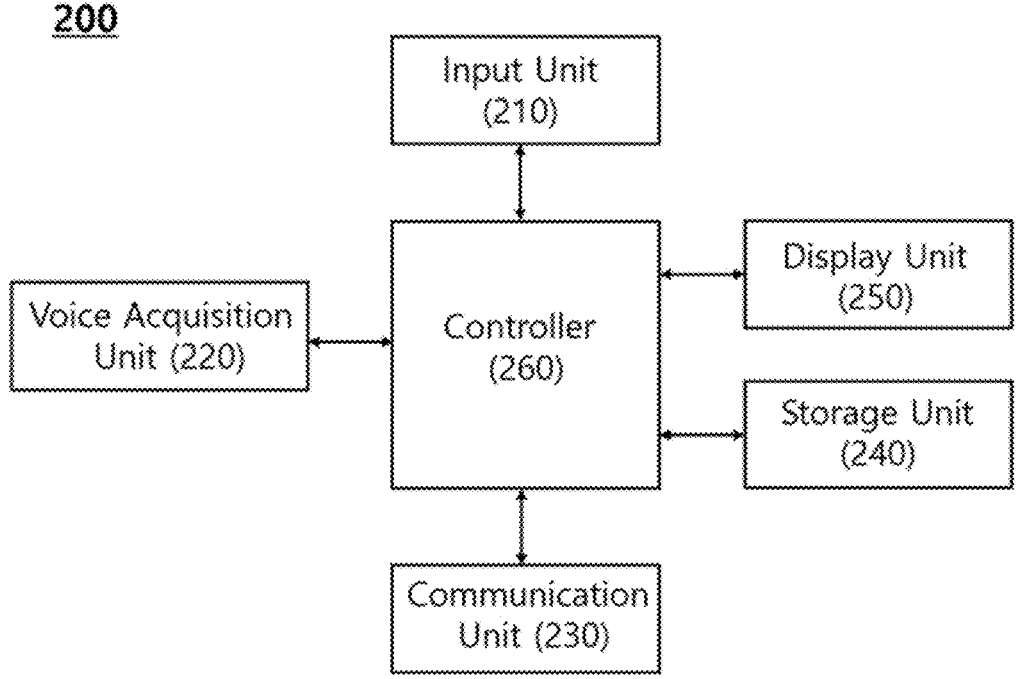
FIG. 2 is a block diagram illustrating some of the components of the user terminal according to an embodiment.

FIG. 2 is a block diagram illustrating some of the components of the user terminal (200) according to an embodiment.

Referring to FIG. 2, the user terminal (200) may include an input unit (210) for receiving an input of the user's profile information, a voice acquisition unit (220) for acquiring the user's voice, a communication unit (230) for transmitting the acquired user's voice and user's profile information to the service providing apparatus (100), a storage unit (240) for storing the user's voice information and the user's profile information and a display unit (150) for displaying various information including information on the conversation connection service, etc.

The input unit (210) for receiving an input of various information including the user's profile information. The user's profile information may include various information, such as sex, age, residing region, occupation, height, photograph, hobbies, skills, taste, style, ideal partner information, etc. The information input as such may be stored in the storage unit (240) or transmitted to the service providing apparatus (100) via the communication unit (230).

The voice acquisition unit (220) may acquire the user's voice information (file) to analyze the disposition of the user.

Specifically, voice information may be information in which the user has directly recorded a voice using a microphone (not shown), and even if the user does not directly record the voice, it may be a voice of the user talking to other people for several seconds or several minutes using the user terminal (100).

The voice information acquired as such may be converted into a digital voice file by the voice acquisition unit (220) and assign an identifier that can identify the user's voice.

The voice file acquired by the voice acquisition unit (220) may be stored in the storage unit (240) of the user terminal (200) or the storage unit (130) of the service providing apparatus (100).

In the case the user directly inputs a voice, the voice acquisition unit (220) selects a voice sample including a specific phrase, and then allows the user to say the same phrase (or phrase displayed on the display unit) spoken by the selected voice sample, and when the user says this phrase, this may be acquired as the user's voice.

The communication unit (230) may perform the role of connecting the user terminal (200) and the service providing apparatus (100) with the network (400).

Accordingly, the communication unit (230) may include at least one module that enables wireless communication between the user terminal (200) and the service providing apparatus (100) or between the user terminal (200) and the social network on which the user terminal (200) of another user is located. For example, the communication unit (230) may include a mobile communication module, a wired internet module, a wireless internet module, a short range communication module, etc.

The mobile communication module transmits and receives a radio signal and at least one of a base station, an external terminal, and a server on a mobile communication network. The radio signal may include data of various forms according to the transmission and reception of a voice call signal, a video call signal or a text/multimedia message.

Furthermore, the wireless internet module refers to a module for wireless internet connection, and may be built-in or externally equipped to the user terminal (100). As wireless internet technology, WLAN (Wireless LAN) (Wi-Fi), Wibro (Wireless broadband), Wimax (World Interoperability for Microwave Access), HSDPA (High Speed Downlink Packet Access), etc. may be used.

The short range communication module may refer to a module for short range communication, and as short range communication technology, Bluetooth, RFID (Radio Frequency Identification), IrDA (infrared Data Association), UWB (Ultra Wideband), ZigBee, etc. may be used.

Meanwhile, the communication methods that may be used by the communication unit (230) are not defined to the communication methods described above, and may include all other forms of communication methods that are widely known or to be developed in the future.

In the storage unit (240), the user's profile information input through the input unit (210) and the user's voice information acquired by the voice acquisition unit (220), and call history information with other users while the user uses this service, etc. may be stored, and such information may be transmitted to the service providing apparatus (100) through the communication unit (230) when requested by the service providing apparatus (100).

Accordingly, the storage unit (240) may include at least one type of storage medium of a Flash Memory Type, a Hard Disk Type, a Multimedia Card Micro Type, a card type memory (SD, XD memory, etc.), RAM (Random Access Memory) SRAM (Static Random Access Memory), ROM (Read-Only Memory), EEPROM (Electrically Erasable Programmable Read-Only Memory), PROM (Programmable Read-Only Memory) magnetic memory, magnetic disks, and optical disks, and may be configured of an integral component with the controller (260) to be described below.

The display unit (250) may display various information relating to the conversation connection service transmitted by the service providing apparatus (100).

Accordingly, the display unit (250) may be implemented as a general display panel, for example, an LCD (Liquid Crystal Display), an LED (Light Emitting Diode), a PDP (Plasma Display Panel), an OLED (Organic Light Emitting Diode), a CRT (Cathode Ray Tube), etc., and may further include a display that can three-dimensionally represent an image, for example, PDLC (polymer dispersed liquid crystal) or SPD (suspended particle devices), etc.

Furthermore, although FIG. 2 illustrates the input unit (210) and the display unit (250) as separate components, they are not limited thereto and when the input unit (210) is configured as a touch screen, the input unit (210) and the display unit (250) may be configured as one component.

The controller (260) provides the user with a conversation connection service, and at the same time, controls the overall operation of the user terminal (200) related thereto.

For example, the controller (260) may perform general communication control and data processing between related modules to process various information, such as information collection, user information management, style tag management, profile information provision, data communication, message transmission, SNS access, etc.

In FIG. 2, it is shown that the controller (260) exists separately for controlling each component. However, even if the controller (260) is not included, all or a part of the functions of the controller (260) may be operated by being distributed and synchronized to each component.

Figure 3:
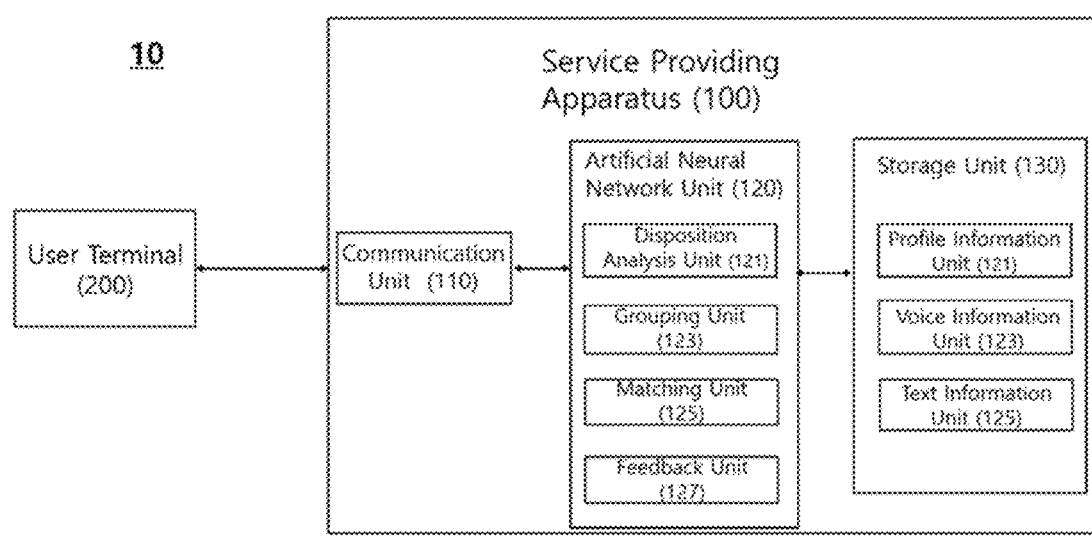
FIG. 3 is a diagram illustrating some of the components of the conversation connection service providing system based on the user's voice according to an embodiment.

FIG. 3 is a diagram illustrating some of the components of the conversation connection service providing system (10) based on the user's voice according to an embodiment.

Referring to FIG. 3, the conversation connection service providing system (10) may include a user terminal (200) described in FIG. 2 and a service providing apparatus (100) for connecting the user with a different user that may be the most suitable conversation partner by performing a voice analysis based on the information received from the user terminal (200).

To achieve this, the service providing apparatus (100) may include a communication unit (110) for communicating with the user terminal (200) as specifically shown in FIG. 3, a disposition analysis unit (121) for analyzing a user's disposition based on information received from the communication unit (110), a grouping unit (123) for grouping the dispositions of the user based on the analysis result, a matching unit (125) for matching other users based on the result of the grouping unit (123), a feedback unit (127) for forming feedback based on the result of conversations between the actually matched users, a profile information unit (131) for storing the user's profile information, a voice information unit (133) for storing the user's voice information, a text information unit (135) for storing text information having modified voice information, etc.

In FIG. 3, the artificial neural network unit (120) was divided into a disposition analysis unit (121), a grouping unit (123), a matching unit (125) and a feedback unit (127). However, the artificial neural network unit (120) is not limited thereto, and may perform the roles of the disposition analysis unit (121), the grouping unit (123), the matching unit (125) and the feedback unit (127) at once. For convenience of description, these components are unified as the artificial neural network unit (120) below.

The communication unit (110) may communicate with the user terminal (200), and may perform the role of connecting the communication with a different user matched with the user by the artificial neural network unit (120).

The artificial neural network unit (120) may analyze the disposition of the user by performing an analysis based on the user's voice information received from the user terminal (200). The voice information may be voice information directly recorded by the user, and may be voice information from calling other users.

The artificial neural network unit (120) may convert the user's voice information to text information, and then perform pre-processing on the converted text information, and then analyze the user's disposition using an analysis model based on the pre-processed information.

The process of converting the user's voice information to text information (STT, speech-to-text) may conduct a process of recording the user's voice, and then converting the recorded file, or perform a process of real-time conversion using a streaming method. Since the technology of converting voice data into text data is a known technology, a description thereof is omitted.

Pre-processing on the text information converted by the artificial neural network unit (120) largely comprises a tokenization process and a parts of speech tagging process When translating a source program, a compiler first identifies a name tag, an operator, a delimiter, etc. based on syntax rules in the source program input as a string of symbols also called word interpretation, and converts them to a string of internal data. The unit identified by such word interpretation is known as a syllable, and the internal data expression is called a token.

Tokenization performed by the artificial neural network unit (120) according to an embodiment is a process of dividing sentences by applying the spaces within sentences as separators, and various methods from basic word tokenization to sentence tokenization may be applied depending on the input sentence.

When the tokenization process is complete, the artificial neural network unit (120) may classify the user's disposition based on text information tokenized by its own analysis model. The user's disposition may be classified using several models that have already been classified, and as shown in FIG. 4, the psychologically the most objective and reliable Big Five personality traits classification model may be used.

Figure 4:
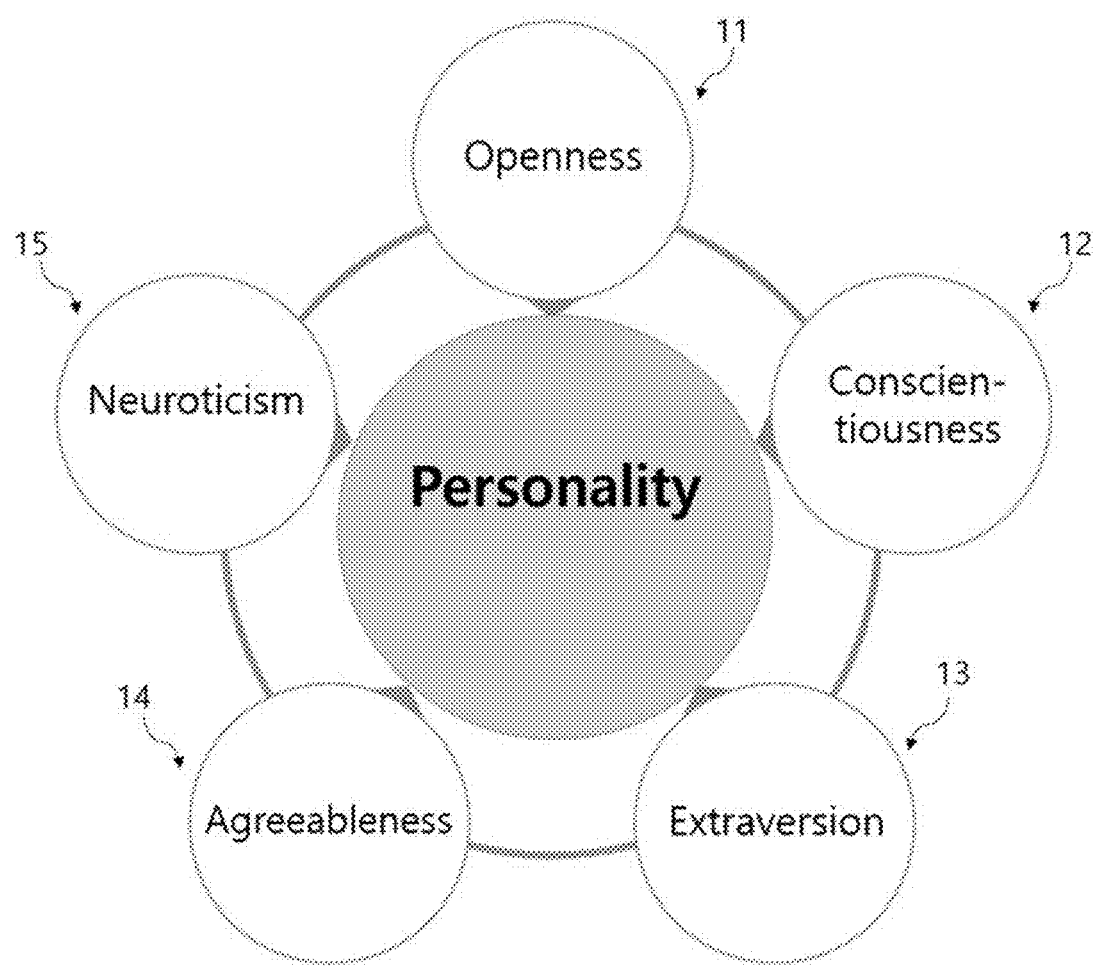
FIG. 4 is a diagram illustrating a model in which human tendencies are classified into five tendencies.

The model shown in FIG. 4 began as a model for understanding the relationship between personality and academic behavior, but has currently been developed into a model that largely divides the human disposition into 5 areas based on several experimental results.

Specifically, the 5 human disposition characteristics may be divided into openness (11), neuroticism (12), agreeableness (13), extraversion (14) and conscientiousness (15) as shown in FIG. 4.

The user may be given a disposition from 0-100% on the five criteria by the artificial neural network unit (120), and the user's disposition may be classified based on such disposition. For example, a user with 95% openness can be seen as having more openness than users with 5%.

Specifically, openness (11) is an evaluation of art, emotion, adventure, imagination, curiosity and various experiences, etc., and those with a high score in openness can be said to have a personality that have high intellectual curiosity, open to emotions, sensitive to beauty, and willing to try new things.

Neuroticism (12) refers to the disposition of easily feel negative emotions, such as anger, anxiety or depression. Accordingly, those having a high score in neuroticism have the disposition of emotionally reacting, being vulnerable to stress, and changing according to the method of expressing their emotions.

Agreeableness (13) refers to having the characteristic of attempting to mediate personal interests in social harmony. Those with a high score in agreeableness are generally considerate, friendly and generous, and have a trustworthy personality. Furthermore, they intend to compromise others' interest with their own interests.

Extraversion (14) is characterized by generating energy from various activities or external environments. Those with a high score in extraversion have the characteristic of enjoying interacting with people, and being passionate and action-oriented.

Conscientiousness (15) may refer to self-control. Those with a high score in conscientiousness have the characteristic of acting with sincerity and pursuing achievements in relation to external expectations.

When a user's disposition is analyzed through such process, the artificial neural network unit (120) may group users' personalities based on the analysis result.

Grouping refers to the process of grouping users with similar personalities into one group, and although the criteria for grouping may be based on the 5 dispositions described in FIG. 4, they are not limited thereto and may be classified using various known models as the criteria, and if the number of calls are accumulated to accumulate the user's voice data, the group to which the user belongs may change based thereon.

When information containing the classified personalities of the users are collected by this grouping process, the artificial neural network unit (120) may match the users to provide a conversation connections service to each other.

Various methods may also be used as the matching method to match the users. For example, those belonging to the same group may be matched, or if it is determined that, even when belonging to different groups, the continuity of conversations between group A and group B is high based on accumulated information, a user in group A may be connected to a user in group B.

Furthermore, the artificial neural network unit (120) may form feedback to the method of analyzing and method of matching the dispositions of the users based on the conversation result between the users connected for conversations based on the matching result.

Specifically, the artificial neural network unit (120) may determine whether the matching was suitable based on the conversation result information between the users.

For example, feedback may be formed based on at least one criteria of information on the emotional state of the user obtained from conversation voice data and text data, rating data for the other user input after a call, call time between the users, whether a call has been extended and whether a "conversation request," which is sent by making a payment if a user is satisfied with the call, has been sent. However, such criteria merely become one criterion of determining whether matching has been suitable, and the embodiments of present invention are not limited thereto. Accordingly, criteria similar to this feature may be included in the embodiments of the present invention.

That is, it can be determined that the user finds a conversation with another user as satisfactory when there is a lot of positive information in the information on the emotional state of the user, when the rating input by the other user after a call is high, when a call time is longer than the average call time with previous users, when a call is longer than the basic given time for a call, when a payment has been made after a call, etc. Accordingly, in such case, it may be determined that matching between the users is suitable, and thus, positive feedback may be given to the matching result.

However, it can be determined that the user finds a conversation with another user as dissatisfactory when there is a lot of negative information in the information on the emotional state of the user, when the rating input by the other user after a call is low, when a call time is shorter than the average call time with previous users, when a call ends before the basic given time for a call ends, when a payment has not been made after a call, etc., and thus, it can be determined that matching between the users is unsuitable. Accordingly, in such case, negative feedback may be given.

Furthermore, the artificial neural network unit (120) may perform deep learning using an artificial neural network module to form feedback.

Deep learning is also known as in-depth learning, which refers to a set of algorithms on machine learning for attempting a high level of abstractions (the process summarizing key contents or functions within a large amount of data or complex data) through a combination of several nonlinear transformation techniques.

Specifically, deep learning is represented in a form (for example, in the case of an image, pixel information is represented as a column vector, etc.) that can be understood by a computer, and is formed of the learning technique on many researches (on how a better representation technique can be formed and how to create a model to learn these) for applying this to learning.

Since the present invention acquires the user's emotional information from the user's voice information, emotional information is acquired using a spectrogram in which the frequency of the voice, the strength of the waveform and the change in intensity, which change over time, are visually represented.

Specifically, the conversation connection service and the conversation connection system according to an embodiment apply a speech emotion recognition model based on CNN (Convolutional Neural Network) specialized for image recognition, which can efficiently recognize images represented on the spectrogram. Although the explanation below is centered on CNN, the artificial neural network model applied in the present invention is not limited to CNN, and RNN (Recurrent Neural Network) may be applied, and a model that is centered on CNN and partially applies RNN may be applied.

Existing studies on speech-based emotion recognition using deep learning train models and predict emotions using a single voice feature value. However, since voice is formed of complex elements, there is a need to design a model using various feature values.

Accordingly, in this embodiment, Mel-spectrogram, MFCC, Centroid and Roll off were used as feature values, and these feature values were applied to a convolutional neural network (CNN) model.

Mel-spectrogram shows the amplitude change in each frequency band over time, and is widely used in the field of speech processing. MFCC is a value that shows the difference in the harmonic structure, which can obtain information on tone. Centroid is a value indicating an average point of energy distribution in a frequency band, and shows which frequency band sound has been primarily used. Roll off is a value indicating which frequency band that 85% of energy occurs, and the distribution of pitch can be ascertained. The artificial neural network model applied in the present invention is examined in detail below in reference to drawings.

Figure 5:
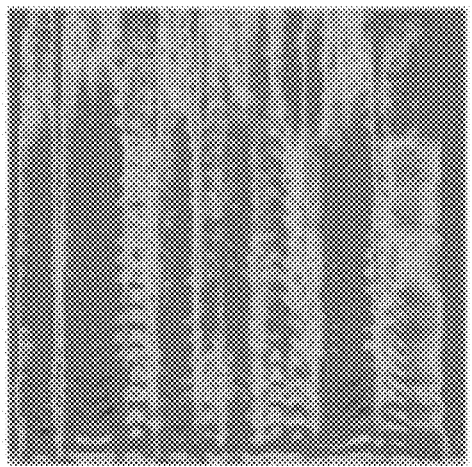
FIG. 5 is a diagram illustrating two examples of spectrograms according to an embodiment.
Figure 5:
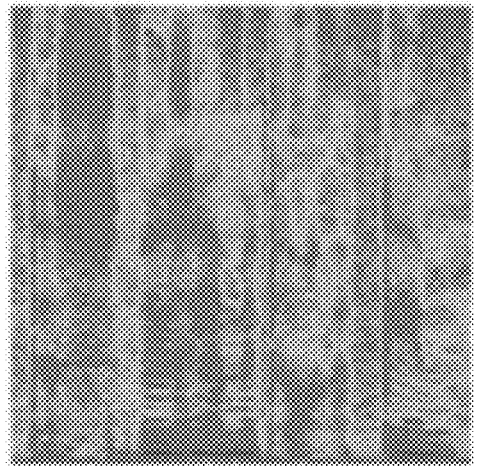
Figure 6:
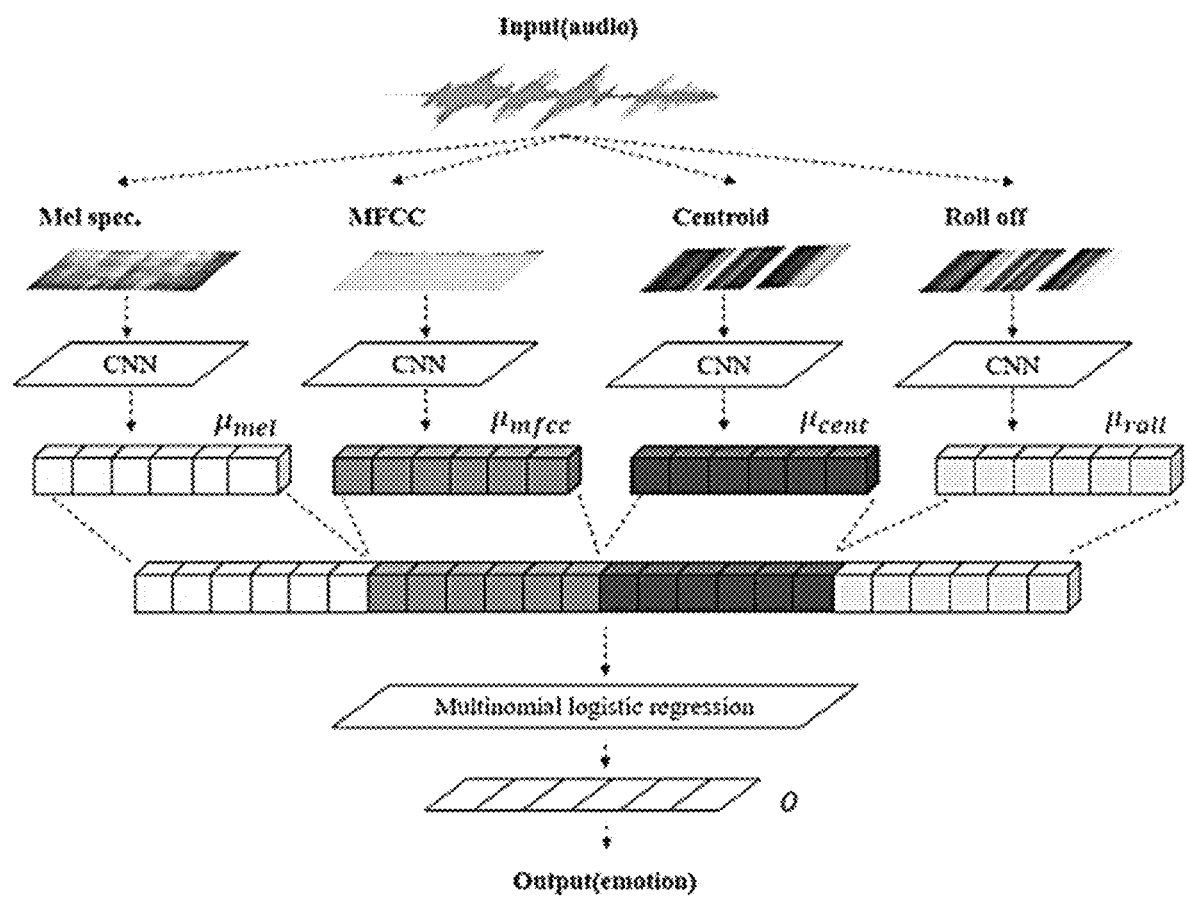
FIG. 6 is a diagram illustrating a CNN-based emotion recognition model using various voice feature values according to an embodiment.
Figure 7:
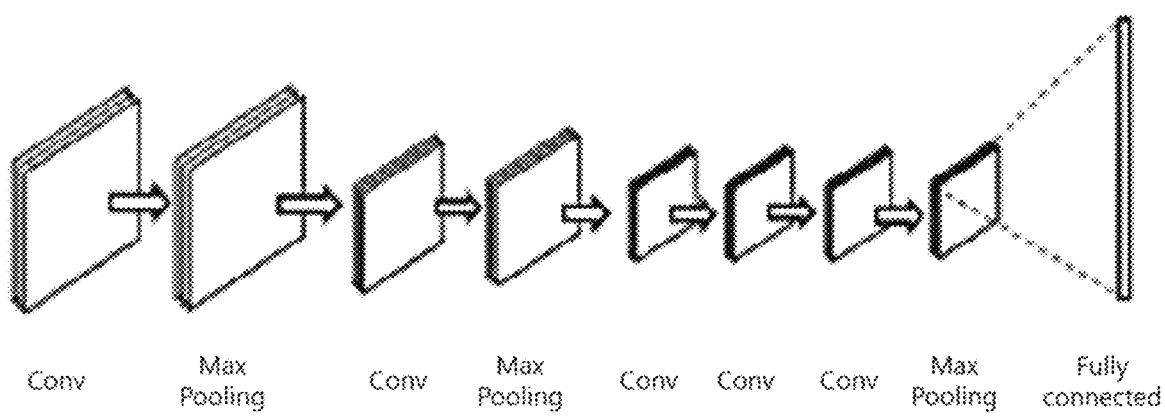
FIG. 7 is a diagram illustrating a convolutional neural network structure applied in an embodiment.
Figure 8:
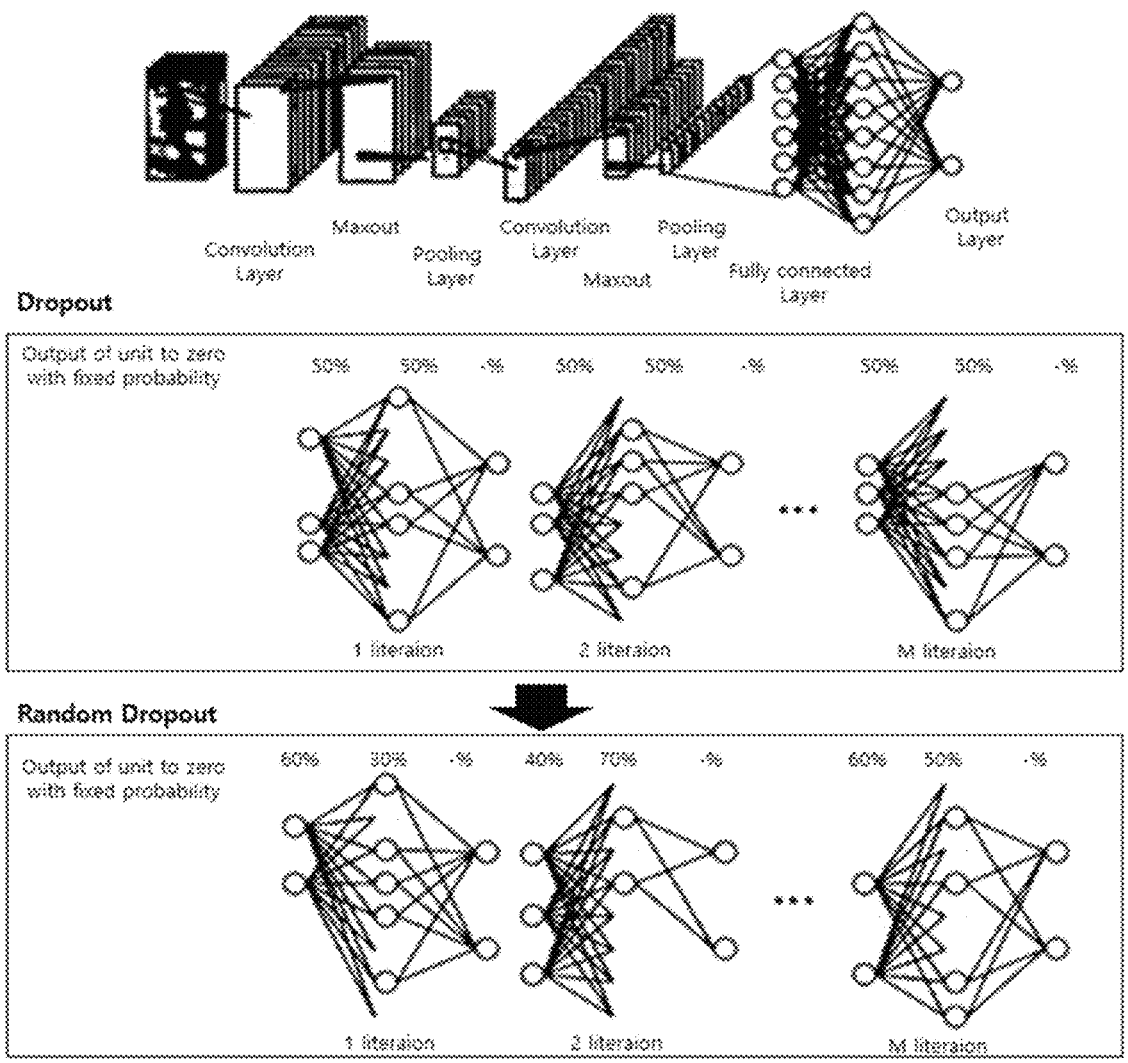
FIG. 8 is a diagram for describing the drop out applied to the convolutional neural network structure.

FIG. 5 is a diagram illustrating two examples of spectrograms according to an embodiment. FIG. 6 is a diagram illustrating a CNN-based emotion recognition model using various voice feature values according to an embodiment. FIG. 7 is a diagram illustrating a convolutional neural network structure applied in an embodiment. FIG. 8 is a diagram for describing the drop out applied to the convolutional neural network structure.

A spectrogram visually represents a change in the strength or intensity of sounds or other signals over time each according to different frequencies. The horizontal axis of a spectrogram represents time and the vertical axis represents frequency, and thus, the colors displayed on the spectrogram also varies depending on a change in the strength or intensity of sounds or signals.

The colors displayed on a spectrogram change according to the presentation of speech relating to a specific emotion. Accordingly, as shown in FIG. 5, a spectrogram of an angry state and a spectrogram of a sad state display different colors.

Since a spectrogram is displayed in the form of an image as shown in FIG. 5, it is the most efficient for learning to progress using CNN (Convolutional Neural Network) specified to image recognition. To present bias due to an imbalance in the number of data during learning, the weight function was used during the calculation of the loss value to resolve this issue. Furthermore, emotions classified into one file were determined using information in which each image divided into small segments for each file is classified.

The configuration of the entire model of the artificial neural network applied according to an embodiment is as shown in FIG. 6. Each feature value was extracted from the user's sound source as a graph image to be used as an input value of the convolutional neural network. Because each feature value includes different information, the structure that was used comprised configuring the convolutional neural network separately for each feature value so that one convolutional neural network learns one feature value in the learning stage, and then integrating them into one neural network. Furthermore, the artificial neural network model applied in another embodiment of the present invention used a model from which the Softmax layer, which is the final layer of the artificial neural network model, is removed.

The final layer of a convolutional neural network is generally formed of a Softmax layer. However, another embodiment of the present invention applied a model implementing a type of ensemble learning by connecting the output value of each convolutional neural network instead of the Softmax layer to the concatenate layer, and then applying multinomial logistic regression as shown in Equations (1) and (2) below.

$$Y = W \cdot \begin{pmatrix} \mu_{mel} \\ \mu_{mfcc} \\ \mu_{cent} \\ \mu_{roll} \end{pmatrix} \quad (W: \text{weight matrix}) \tag{1}$$

$$O_i = \frac{e^{y_i}}{\sum e^{y_i}} (o_i \in O, y_i \in Y, 1 \leq i \leq 6) \tag{2}$$

The application of this technique has the advantage of obtaining higher accurately while considering all voice feature values used in the model.

The structure of the convolutional neural network used in the model is as shown in FIG. 7. Unlike existing models, the fully connected layer, which comprised of three layers, were modified to one layer, and the output was configured as a 1×6 vector. Furthermore, to prevent overfitting, batch normalization and drop out were applied.

The drop out method, as shown in FIG. 8, does not use all of the neurons in the hidden layer during each learning, but uses about 50% of the neurons. This achieves the effect of ensembling several small neural networks in one deep learning, and it is known that ensembles greatly reduce overfitting. Furthermore, neurons having similar weights are reduced, which reduces neurons that make redundant judgments, and thus, it has the advantage of efficiently using neurons.

Figure 9:
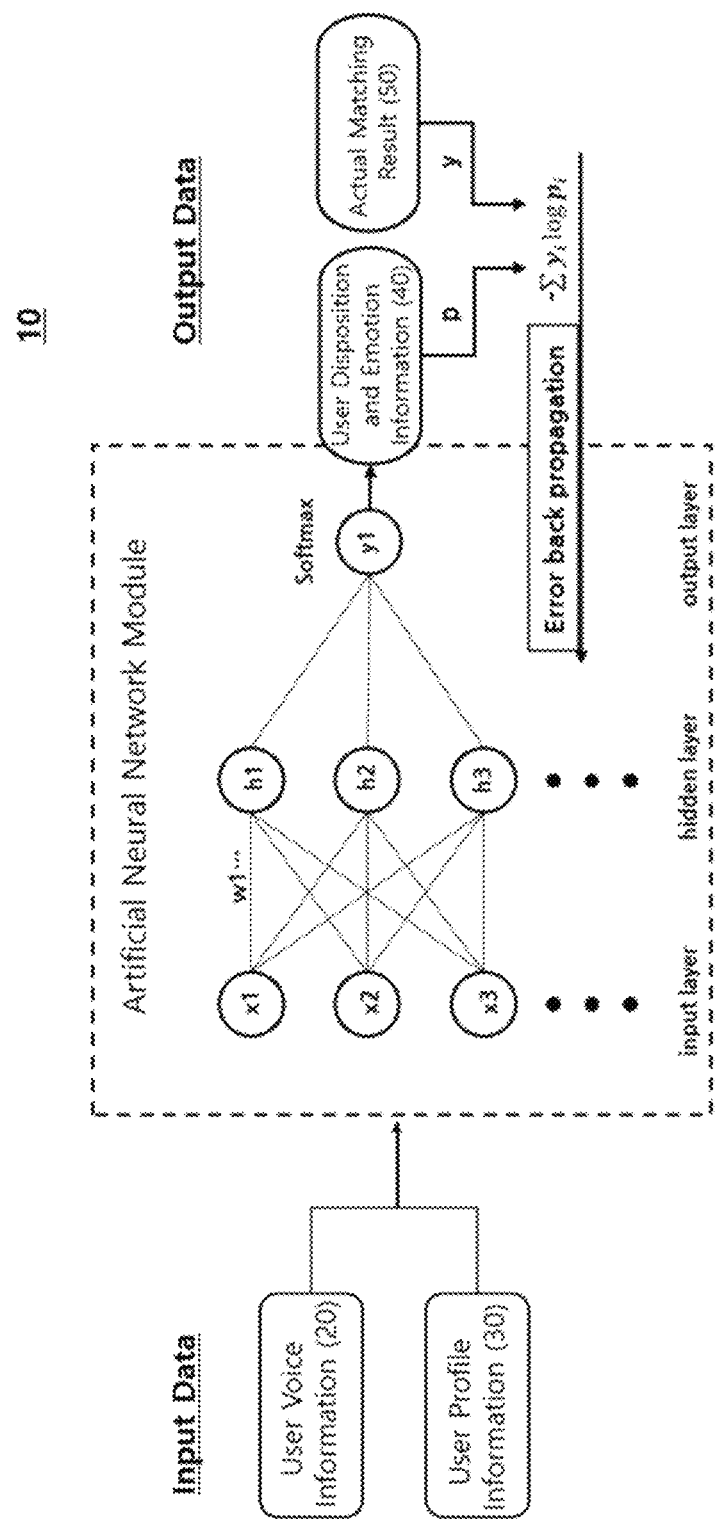
FIG. 9 is a diagram illustrating a combined relationship of the artificial neural network module explained in FIGS. 6 to 8.

FIG. 9 is a diagram illustrating a combined relationship of the artificial neural network module explained in FIGS. 6 to 8.

Referring to FIG. 9, each attribute constituting user voice information (20) and user profile information (30) may be input to each node on the input layer of the artificial neural network module, such as x1, x2 and x3. As input data, the user voice information (20) and the user profile information (30) may be input together as shown in FIG. 9. However, only one user voice information (20) or one user profile information (30) may be input as input data.

When input data is input to each node on the input layer of the artificial neural network module, deep learning is achieved via a hidden layer, such as h1, h2 and h3, based on the same weight as w1, and the user's disposition information and emotional information (40) may be output on the output layer, which is y1, based thereon. The output information may be back propagated so as to update the weight of the hidden layer in the direction of reducing error (−Sigma(yi*log(pi)) based on conversation result information (50) of the actual users.

Using such a method, the artificial neural network unit (120) may classify 5 emotions (anger, joy, sadness, fury, neutrality) of the user in the user's voice information. For example, a suitability may be calculated using a method of giving a positive weight when 80% or more of a waveform indicating a joyful emotion is detected, and giving a negative weight when 80% or more of a waveform indicating an angry or furious emotion is detected.

Furthermore, the artificial neural network unit (120) may not only extract the user's emotional state information from the voice information as described above, but can also extract adjectives/adverbs related to positive/negative from STT-processed text information to determine the user's emotional state based thereon.

Specifically, the artificial neural network unit (120) may extract the user's emotional information based on a dictionary and a vocabulary list composed of positive letters/words and negative letters/words that have been classified in advance. There is a total of 6 word lists including positive adjectives, positive adverbs, negative adjectives, negative adverbs and nouns and verbs.

For example, when positive adjectives, such as "good," "interesting," "funny," etc. are detected, it is determined as a positive call, and a positive weight is provided to determine the user's emotional state, and in contrast, when negative adjectives, such as "boring," or swear words registered on the list are detected or when gaps between talking is longer than the overall average, it is determined as a negative call, a negative weight is provided to determine the user's emotional state.

Furthermore, the artificial neural network unit (120) may use the result of a disposition analysis test in a form in which the user directly selects and responds to multiple choices as a supplementary method to increase the accuracy of analyzing the user's disposition.

The disposition analysis test is a questionnaire prepared to analyze the user's disposition, which includes a short version and an advanced version, and the user may respond to a minimum of 12 questions to a maximum of 100 questions.

The result of the user's response to the questionnaire may indicate the user's disposition using 4 criteria by an analysis by the artificial neural network unit (120). Specifically, each criterion is formed of two polar dispositions. For example, it may be divided into extroverted/introverted, sensing/intuitive, thinking/feelings, judgmental/perceptive, etc. Accordingly, the user may be classified into one of 16 dispositions, and this result may be used as an auxiliary means of the means of basic grouping as described above.

Furthermore, the artificial neural network unit (120) may match the user with a conversation partner based on information on hobbies or interests from the information input by the user. Users that generally have an interest in the same hobbies easily form a rapport to continue conversations without awkwardness, and thus, conversation partners may be connected based thereon.

Furthermore, the artificial neural network unit (120) may extract the voice range and speed that are universally preferred by the sexes regardless of the topic of conversation through the obtained voice information of the user, and may analyze the user's disposition based thereon. In addition, a guideline may be suggested to the users based on such information.

Furthermore, the artificial neural network unit (120) may match a suitable partner for each time period during which the user connects, when the user's emotional information for each time period has been accumulated.

Figure 10:
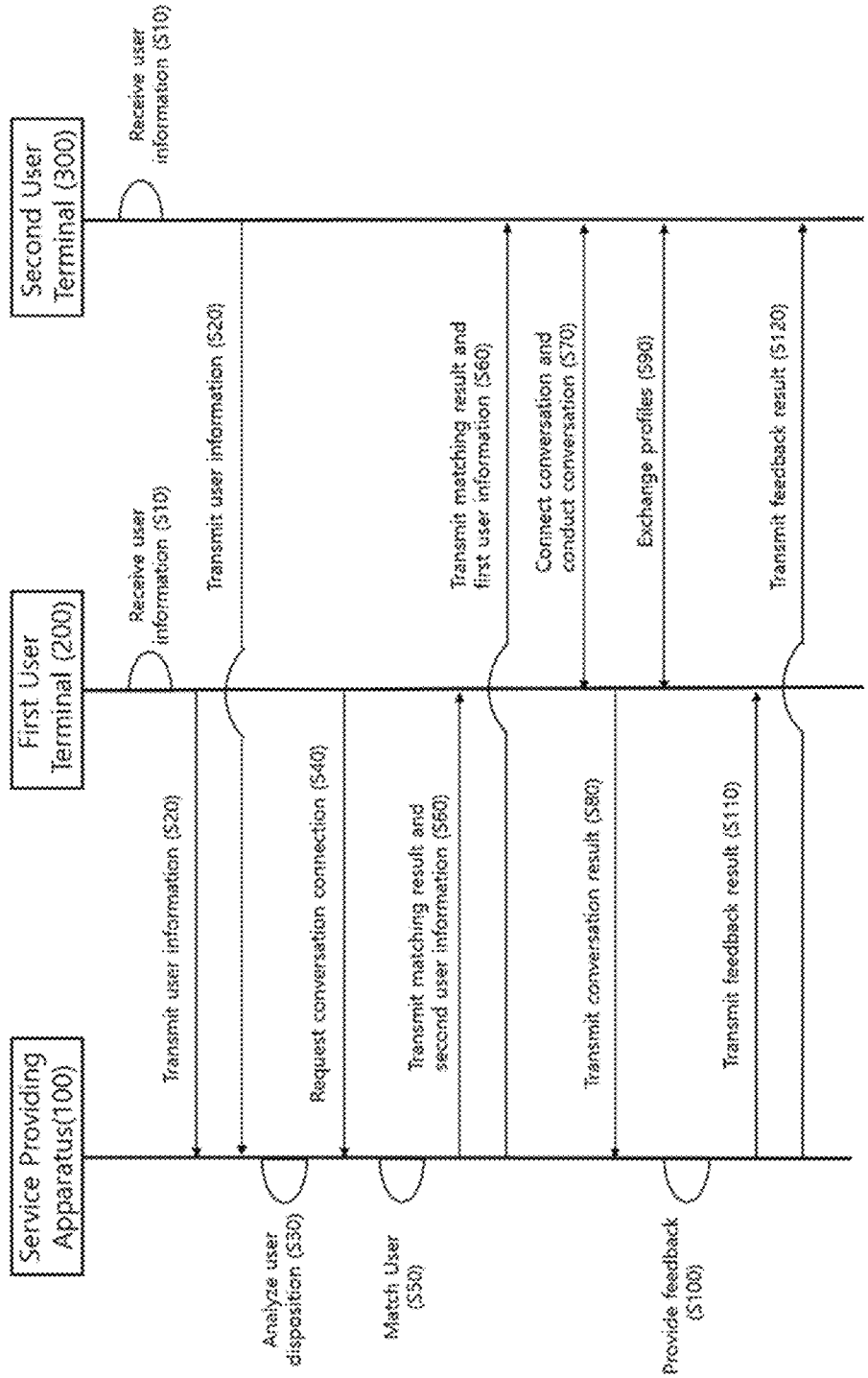
FIG. 10 is a diagram illustrating a flow chart of a method of providing a service based on a user's voice according to an embodiment.
Figure 11:
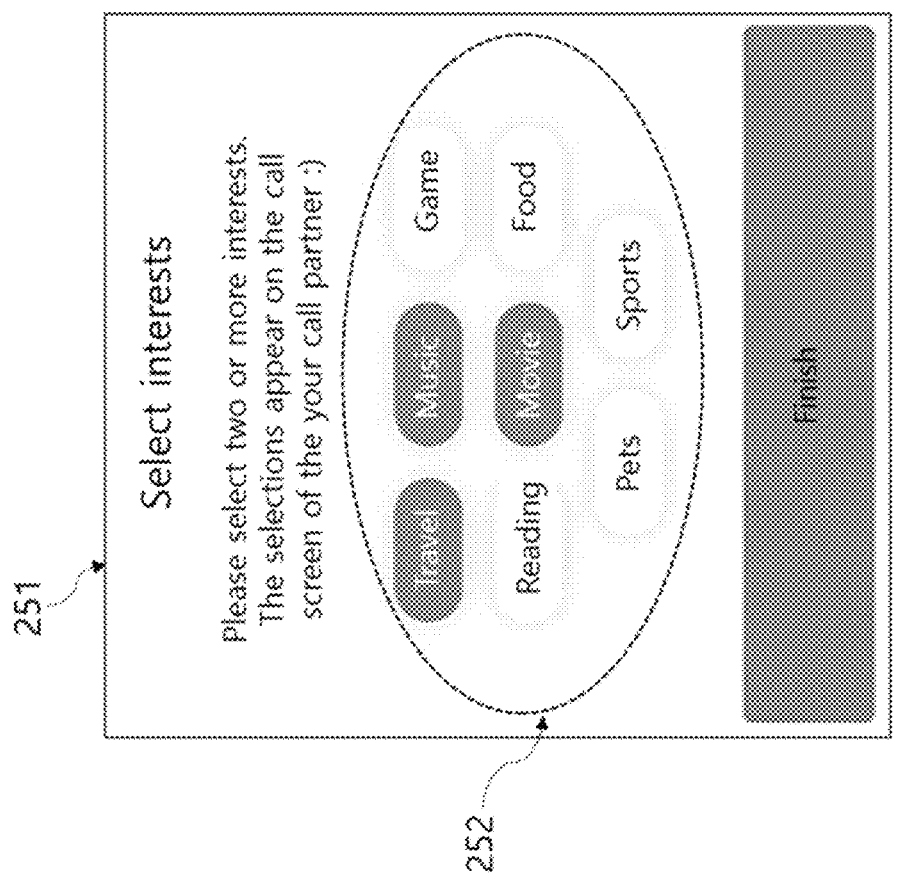
FIG. 11 is a diagram illustrating a method in which the user inputs his or her profile information.
Figure 12:
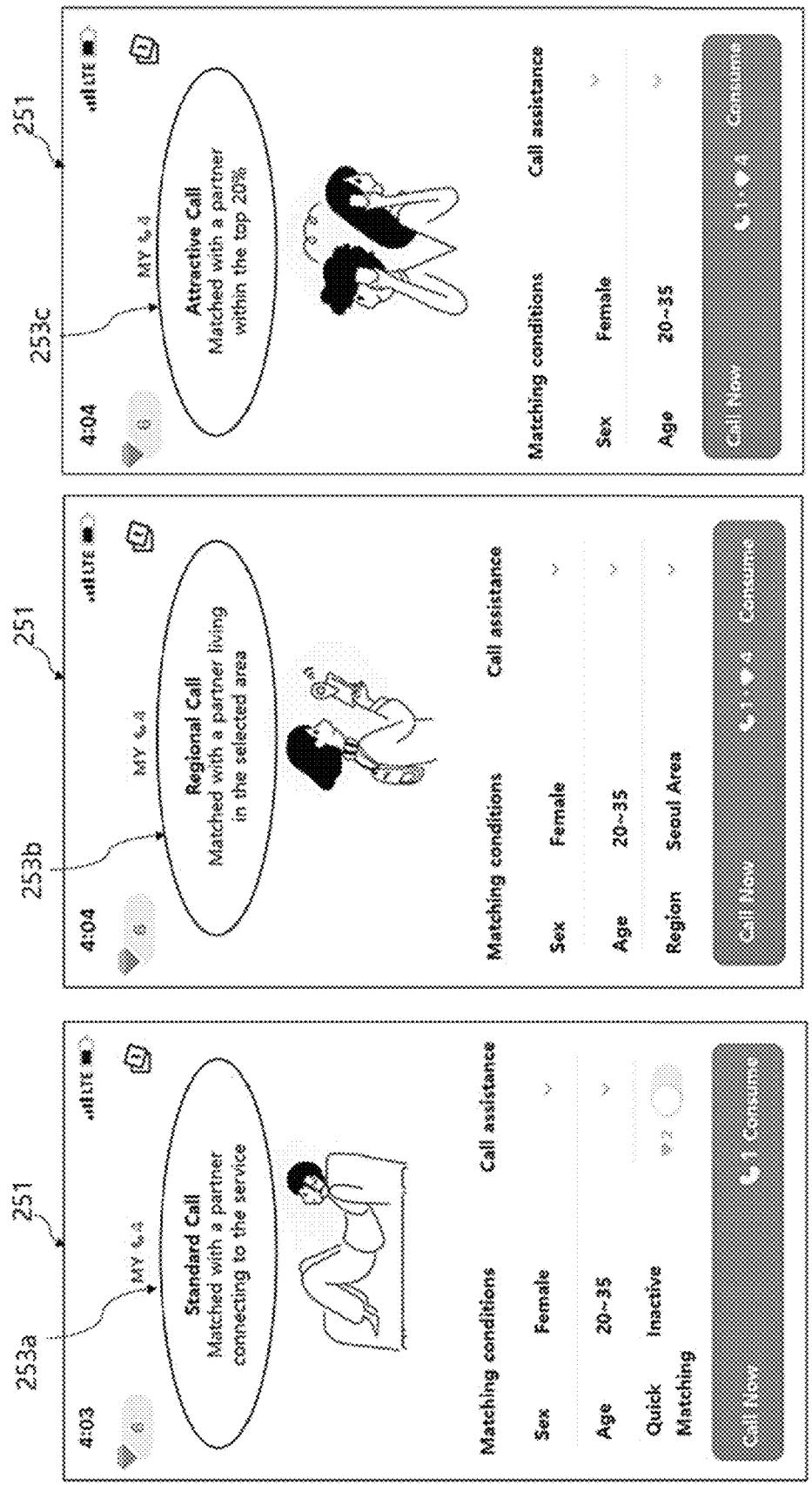
FIG. 12 is a diagram illustrating the type of conversation partner that may be selected by the user.
Figure 13:
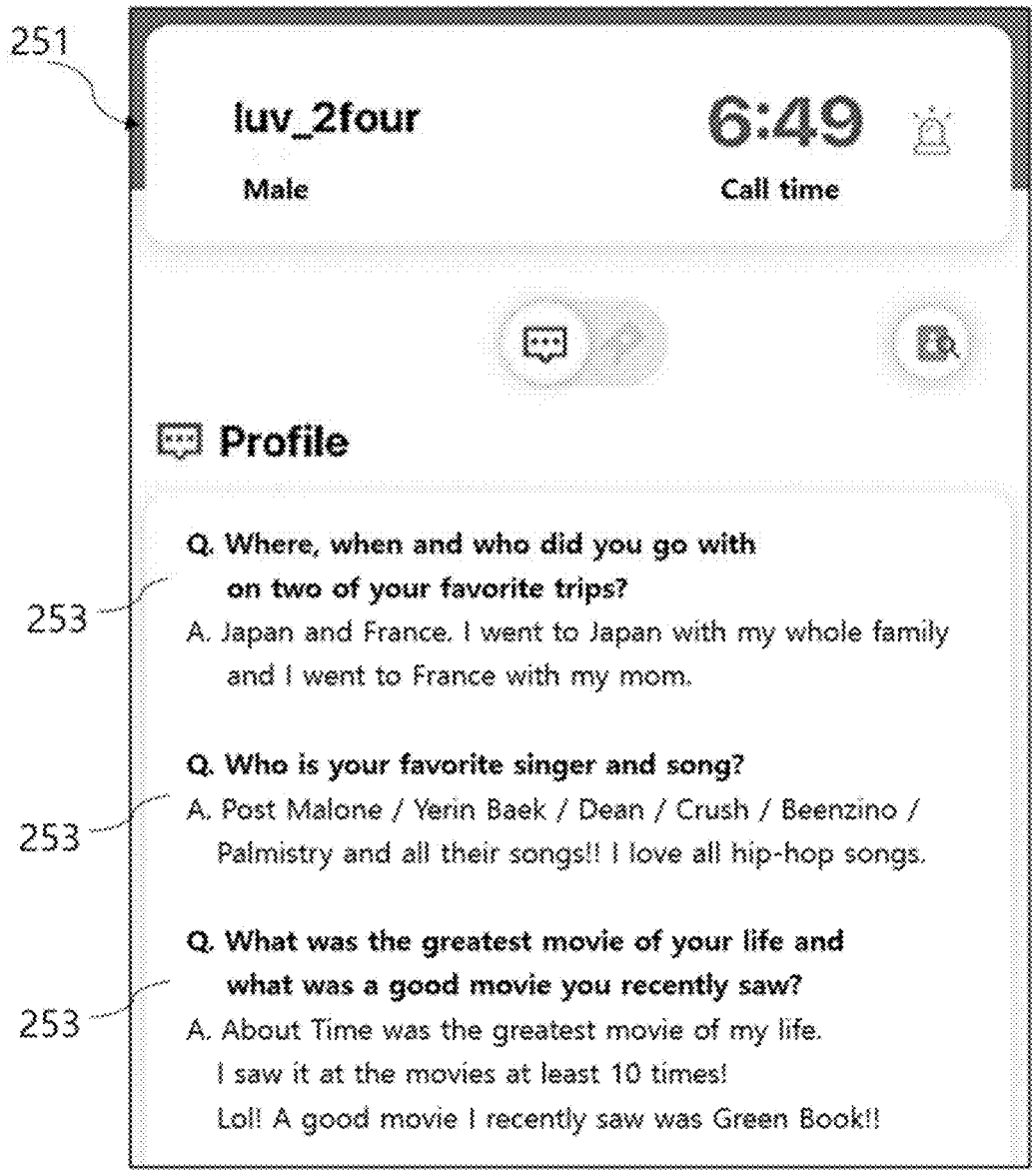
FIG. 13 is a diagram illustrating an example of the profile information of a conversation partner provided to the user.

For example, if a first user may want an interesting and funny phone call between 7 pm and 9 pm on average, but want a sympathetic and serious phone call between 1 am and 3 am, the user may be matched with a conversation partner based on the user's emotional information of each of the time periods FIG. 10 is a diagram illustrating a flow chart of a method of providing a service based on a user's voice according to an embodiment. FIG. 11 is a diagram illustrating a method in which the user inputs his or her profile information. FIG. 12 is a diagram illustrating the type of conversation partner that may be selected by the user. FIG. 13 is a diagram illustrating an example of the profile information of a conversation partner provided to the user.

Referring to FIG. 10, the first user terminal (200) and the second user terminal (300) receive information of the first user and information of the second user, respectively, and the received information may be transmitted to the service providing apparatus (100).

Here, the user information may include both the user's profile information and voice information, wherein the profile information may include various information, such as sex, age, residing region, occupation, height, photograph, hobbies, skills, taste, style, ideal partner information, etc., and wherein the voice information may include phone call information.

Furthermore, as shown in FIG. 11, the users input their own information using an interface screen (251) displayed on the screen of the display unit (250). The interface screen (251) may display items (252) that can be selected by the user.

The service providing apparatus (100) may analyze the user's disposition by performing deep learning using the artificial neural network unit (120) based on the user's information received from the first user terminal (200) and the second user terminal (300) (S30).

In the drawings, the invention was explained by defining the number of users to a first user and a second user due to the limits of the paper, but the number of users is not limited thereto, and the service providing apparatus (100) may receive information of a plurality of users and analyze the disposition of all users whose information is received, and provide a conversation connection service to many users based thereon.

After completing an analysis of the user's disposition, the user may transmit a conversation connection request to the service providing apparatus (100) using the user terminal (S40).

When the user transmits a conversation connection request, the user may select and request one matching from various types of matching.

For example, as shown in FIG. 12, a conversation connection may be requested by selecting any one of a standard call connection service (253a) connecting standard members connected to the service providing apparatus (100) on the interface (251) screen, a regional call connection service (253b) connecting with users living in a selected region, and an attractive call connection service (253c) connecting with a popular user of a specific percentage.

When the call connection request is received, the service providing apparatus (100) may perform deep learning using the artificial neural network unit (120), and then match the user with the call connection partner based thereon (S50). The method of matching with a call connection partner has been explained in detail above, and thus, is omitted.

When a call connection partner is matched, the service providing apparatus (100) may transmit the matching result and information on the user to the user terminal.

For example, if the first user and the second user have been matched, the service providing apparatus (100) may transmit information on the second user to the first user terminal (200), and transmit information on the first user to the second user terminal (300), and accordingly, the first user and the second user may proceed with their conversation (S60, S70).

Information on the conversation partner delivered to the user may include information on the profile input by the user as shown in FIG. 13. Accordingly, the user may use this information to easily proceed with the conversation.

Furthermore, although not shown in the drawing, the service providing apparatus (100) may convert the topics of conversation preferred by the user into keywords to provide them using the interface on the screen of the user terminals (200, 300). Through which, the user may ascertain the topics of conversation preferred by the conversation partner, thereby having the effect of allowing them to mutually continue their call.

For example, if the conversation partner is a user that spends most of the call talking about movies, not only the keyword "movie," but specifically mentioned names of movies and genres may be provided to the user using the interface.

Furthermore, information on the hobbies and interests input by the conversation partner is fundamentally displayed on the screen of the user terminal during a call. Accordingly, the users may conduct a conversation based thereon, so as to easily overcome the awkwardness at the beginning of the conversation.

Furthermore, in addition to information on hobbies and interests, a service called "conversation tips" may also be provided on the interface during a call to help the users to comfortably continue with their conversation.

Conversation tips refer to situational text, such as "I generally tend to strike up conversations when I meet people," from which each other's dispositions can be deduced. Accordingly, users may not only carry out general conversations, but also collect conversational texts that reveal the users' personal values and proceed with conversations based thereon.

Furthermore, users may record and register an answer to a question or a specific topic to their own profile, and thus, the user may use the voice information of the conversation partner to continue on a conversation. The voice information reveals values more directly than general text, and thus, may be used as good information in determining a conversation partner's personality.

Once a conversation ends, the conversation result is transmitted to the service providing apparatus (100), and a feedback process of analyzing the disposition of the user may be performed based on the conversation result (S80, S100).

Feedback may be formed using the artificial neural network unit (120), and the result thereof may be transmitted to the user terminals (200, 300) for the user to provide feedback on their own conversation method and skills. The method of forming feedback has been explained in detail, and thus, is omitted.

Furthermore, after a conversation ends, conversation partners may exchange profile information with each other if their conversation was satisfactory (S120).

A method and system of providing a service based on a user's voice according to an embodiment analyzes the disposition of a user based on the user's voice and conversations, and then connects the user with a partner to allow conversations to flow smoothly based on the analysis result, and thus, has the advantage of allowing the users to more easily continue their conversation Furthermore, it connects conversation partners having similar dispositions as the user, and thus, it becomes easy for the user to identify with the partner based on the smooth progression of their conversation.

So far, a method and apparatus for providing a document editing interface for providing resource information related to a document using a backlink button according to the embodiment have been described in detail.

Accordingly, conversation connection services have been recently released to connect people who can comfortably share their thoughts and chat while simultaneously reducing the burden of such offline meetings, which are receiving favorable responses from many people.

However, even in the services according to conventional technology, the operators providing such services also randomly matched registered members as conversation partners, and thus, there were problems where the arrangements did not lead to continued conversations when each other's conversational styles did not match.

In addition, when talking over the phone, conversations can continue only when the tastes or personalities of each other are well matched, more than when talking in person.

However, the services according to conventional technology had the problem of connecting conversation partners without properly reflecting the user's tastes, or dispositions and personalities, etc.

A method and system of providing a service based on a user's voice according to an embodiment analyzes the disposition of a user based on the user's voice and conversations, and then connects the user with a partner to allow conversations to flow smoothly based on the analysis result, and thus, has the advantage of allowing the users to more easily continue their conversation Furthermore, it connects conversation partners having similar dispositions as the user, and thus, it becomes easy for the user to identify with the partner based on the smooth progression of their conversation.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

The invention claimed is:

1. A method for providing a service based on a user's voice comprising:
   extracting by a voice acquisition unit a voice of a first user;
   generating by an artificial neural network unit text information or voice waveform information based on the voice of the first user;
   analyzing by the artificial neural network unit a disposition of the first user based on the text information and the voice waveform information, and then selecting by the artificial neural network unit a second user corresponding to the disposition of the first user based on the analysis result;
   providing by the artificial neural network unit the first user with a conversation connection service with the second user; and
   acquiring by the artificial neural network unit information on a change in an emotional state of the first user based on conversation information between the first user and the second user, and re-selecting by the artificial neural network unit the second user corresponding to the disposition of the first user based on the acquired information on the change in the emotional state of the first user,
   wherein analyzing the disposition of the first user and selecting the second user comprises:
   performing deep-learning by the artificial neural network unit based on a speech emotion recognition model based on CNN (Convolutional Neural Network) by applying at least one of user voice information and user profile information as an input value and applying a user's emotional information and disposition information as an output value to analyze the disposition of the first user and select the second user, and
   wherein the speech emotion recognition model based on CNN applies a structure implemented by applying multinomial logistic regression after connecting the output value of each neural network instead of a Softmax layer to a concatenate layer.

2. The method for providing a service based on a user's voice according to claim 1, wherein the analyzing by the artificial neural network unit the disposition of the first user based on the text information and the voice waveform information comprises:
   analyzing the disposition of the first user based on a frequency of appearance of a specific word in the text information of the first user.

3. The method for providing a service based on a user's voice according to claim 1, further comprising providing by the artificial neural network unit a feedback on analyzing the disposition of the first user and selecting the second user based on at least one of rating information input after a call between the first user and a second user, call time information, whether a call has been extended, frequency of appearance of a specific word during a call and whether a fee has been paid.

4. The method for providing a service based on a user's voice according to claim 1, wherein the speech emotion recognition model based on CNN uses at least one of Mel-spectrogram, MFCC, Roll off and Centroid as a feature value.

5. The method for providing a service based on a user's voice according to claim 1, wherein the analyzing the disposition of the first user comprises:
   analyzing by the artificial neural network unit the disposition of the first user based on response information of the first user on a disposition analysis survey.

6. The method of providing a service based on a user's voice according to claim 1, wherein the analyzing by the artificial neural network unit the disposition of the first user comprises:
   analyzing by the artificial neural network unit the disposition of the first user using at least one of the sex, age, voice range and speed of the first user.

7. The method for providing a service based on a user's voice according to claim 1, wherein the selecting by the artificial neural network unit the second user comprises:
   selecting by the artificial neural network unit a second user based on a type of conversation preferred by the first user for each time period.

* * * * *